(12) United States Patent
Manjeshwar et al.

(10) Patent No.: US 7,813,382 B2
(45) Date of Patent: Oct. 12, 2010

(54) METHOD AND SYSTEM FOR TIME SYNCHRONIZATION IN COMMUNICATION NETWORKS

(75) Inventors: Arati Manjeshwar, Chandler, AZ (US); Lakshmi Venkatraman, Mountain View, CA (US); Bhaskar Srinivasan, Menlo Park, CA (US)

(73) Assignee: Robert Bosch GmbH, Stuttgart (DE)

( * ) Notice: Subject to any disclaimer, the term of this patent is extended or adjusted under 35 U.S.C. 154(b) by 847 days.

(21) Appl. No.: 11/241,298

(22) Filed: Sep. 30, 2005

(65) Prior Publication Data

US 2007/0076762 A1 Apr. 5, 2007

(51) Int. Cl.
*H04J 3/06* (2006.01)
*H04J 3/08* (2006.01)
*H04L 12/56* (2006.01)

(52) U.S. Cl. .................. 370/503; 370/301; 370/326; 370/395.4; 370/508; 370/519; 370/507; 370/509; 370/510; 370/512; 370/520

(58) Field of Classification Search ............... 370/503, 370/507, 509, 510, 512, 513, 514, 520, 350, 370/301, 326, 395.4, 508, 519
See application file for complete search history.

(56) References Cited

U.S. PATENT DOCUMENTS

| 2,350,008 | A | 5/1944 | Artzt |
| 4,663,744 | A | 5/1987 | Russell et al. |
| 5,687,200 | A | 11/1997 | Berger |
| 6,215,862 | B1 | 4/2001 | Lopes |
| 6,467,003 | B1 | 10/2002 | Doerenberg et al. |
| 2002/0072875 | A1* | 6/2002 | Barney et al. ............... 702/178 |
| 2005/0122231 | A1 | 6/2005 | Varaiya |

FOREIGN PATENT DOCUMENTS

| EP | 1 176 752 | 1/2002 |
| WO | WO 99/12267 | 3/1999 |

OTHER PUBLICATIONS

IEEE 802.15.4, "Part 15.4 Wireless Medium Access Control (MAC) and Physical Layer (PHY) Specifications for Low-Rate Wireless Personal Area Networks (LR-WPANs)", Oct. 1, 2003, IEEE, all pages.*
Warner, William, "OFDM/FM Frame Synchronization for Mobile Radio Data Communication", 1993, IEEE, all pages.*
Elson, Jeremy, "Time Synchronization for Wireless Sensor Networks", Feb. 5, 2002, University of California Dept. of Comp. Sci., all pages.*

(Continued)

*Primary Examiner*—Kwang B Yao
*Assistant Examiner*—Adam Duda
(74) *Attorney, Agent, or Firm*—Kenyon & Kenyon LLP

(57) ABSTRACT

A method of synchronizing a network includes transmitting a tone signal to convey time information and setting a local time according to the conveyed time information. The method may also include detecting an occurrence of a predefined aspect of the tone signal, and setting a local time based on the occurrence of the predefined aspect of the signal.

22 Claims, 5 Drawing Sheets

OTHER PUBLICATIONS

Elson, Fine-Grained Network Time Synchronization Using Reference Broadcasts, Dec. 2002, Proceedings of the Fifth Symposium on Operating Systems Design and Implementation, all pages.*

Elson2, "Time Synchronization for Wireless Sensor Networks", 2001, International Parallel and Distributed Processing Symposium, all pages.*

Elson3, "Time Synchronization in Wireless Sensor Networks", 2003, Univeristy of California—Los Angeles, all pages.*

European Search Report, Application No. EP 06020061, dated Sep. 4, 2009.

* cited by examiner

METHOD AND SYSTEM FOR TIME SYNCHRONIZATION IN COMMUNICATION NETWORKS

CROSS REFERENCE TO RELATED APPLICATIONS

This application is related to U.S. Patent Applications entitled "Method and System for Providing Acknowledged Broadcast and Multicast Communication" Ser. No. 11/240,401, "Method and System for Providing an Energy Efficient Exchange of Information in Wireless Networks" Ser. No. 11/239,837, "Method and System for Providing Interference Avoidance and Network Coexistence in Wireless Systems" Ser. No. 11/240,545, "Method and System for Reliable Data Transmission in Wireless Networks" Ser. No. 11/239,836, "Method and System to Reduce Delay and/or Energy Consumption in a Multi-Hop Wireless System" Ser. No. 11/240,436, "Method and System for Providing a Modified Time Division Multiple Access (TDMA) for Reduced Delay" Ser. No. 11/241,639, "Method and System for Providing Reliable Communication with Redundancy for Energy Constrained Wireless Systems" Ser. No. 11/241,300, "System and Method for a Communication Protocol for Wireless Sensor Systems Including Systems with High Priority Asynchronous Message and Low Priority Synchronous Message" Ser. No. 11/241,296, "Method and System to Reconfigure a Network to Improve Network Lifetime Using Most Reliable Communication Links" Ser. No. 11/240,434. The disclosure of each of the foregoing related applications is hereby incorporated by reference herein in its entirety.

FIELD OF THE INVENTION

The present invention relates to a method and system for time synchronization in a communication networks.

BACKGROUND INFORMATION

Time synchronization may be important in certain applications, for example, to coordinate different parts in industrial machines, assembly lines, and other sensor and actuator networks. Time synchronization may also be required for Time Division Multiple Access (TDMA) based techniques in communication networks.

In communication networks, the clocks of different nodes may drift due to, for example, crystal inaccuracies. In systems that require time synchronization, synchronization may be achieved by periodically exchanging messages between the nodes. The synchronization message has been implemented in the format of a packet which includes the local time of the sender so that the receiver may set its local time (e.g., its clock) as soon at it receives the packet. The synchronization message may be long and the process energy inefficient. In particular, the packet may be long because it includes headers and several bytes of time information.

An exemplary embodiment and/or exemplary method of the present invention is directed to method of synchronizing a network, which includes transmitting a tone signal to convey time information, and setting a local time according to the conveyed time information.

Another exemplary embodiment and/or exemplary method of the present invention is directed to method of synchronizing a network, in which the signal includes a preamble followed by a start symbol and the local time is set when the start symbol is received.

Yet another exemplary embodiment and/or exemplary method of the present invention is directed to method of synchronizing a network, which includes setting a clock of a receiver to a predefined time when one of the tone signal ends and a predefined pattern within the tone signal is received.

Still another exemplary embodiment and/or exemplary method of the present invention is directed to method of synchronizing a network, in which the signal is a short tone.

Yet another exemplary embodiment and/or exemplary method of the present invention is directed to method of synchronizing a network, in which the network includes wireless sensor nodes.

An exemplary embodiment and/or exemplary method of the present invention is directed to a method for synchronizing a communication network, which includes transmitting a tone signal, detecting an occurrence of a predefined aspect of the tone signal, and setting a local time based on the occurrence of the predefined aspect of the signal.

Another exemplary embodiment and/or exemplary method of the present invention is directed to a method for synchronizing a communication network, in which the predefined aspect is a start symbol and/or the predefined aspect is an ending of the tone signal.

Yet another exemplary embodiment and/or exemplary method of the present invention is directed to a method for synchronizing a communication network, which includes periodically waking up from a sleep cycle to detect the occurrence of the predefined aspect of the tone signal.

Still another exemplary embodiment and/or exemplary method of the present invention is directed to a method for synchronizing a communication network, in which the tone signal is transmitted for at least a period of maximum clock skew between a transmitter and a receiver.

Yet another exemplary embodiment and/or exemplary method of the present invention is directed to a method for synchronizing a communication network, in which the elements of the network form a chain and/or tree topology and the method is repeated.

An exemplary embodiment and/or exemplary method of the present invention is directed to a communication system, which includes a transmitter to transmit a signal to convey time information, and a receiver to receive the signal and set a local time based on the conveyed time information.

Another exemplary embodiment and/or exemplary method of the present invention is directed to a communication system, in which the local time is set when a predefined part of the signal occurs or when the signal ends.

Yet another exemplary embodiment and/or exemplary method of the present invention is directed to a communication system, in which the signal is a tone.

Still another exemplary embodiment and/or exemplary method of the present invention is directed to a communication system, in which the tone includes a preamble followed by a start symbol.

Yet another exemplary embodiment and/or exemplary method of the present invention is directed to a communication system, in which the local time is set when the start symbol is received.

Still another exemplary embodiment and/or exemplary method of the present invention is directed to a communication system, in which the receiver periodically wakes up from a sleep cycle to receive the signal, and the signal is transmitted for at least a period of a maximum clock skew between the transmitter and receiver.

An exemplary embodiment and/or exemplary method of the present invention is directed to an apparatus for synchronizing a communication network, which includes a first arrangement to transmit a tone signal, a second arrangement to received the tone signal, a third arrangement to detect an occurrence of a predefined aspect of the tone signal, and a fourth arrangement to set a local time based on the occurrence of the predefined aspect of the signal.

SUMMARY OF THE INVENTION

The exemplary embodiment and/or exemplary method of the present invention provides a method and system to synchronize the elements of a communication network with respect to time, which may be efficient and require less resources.

According to an exemplary embodiment and/or exemplary method of the present invention, time synchronization is provided using only a signal or tone without the need for additional headers or bytes of time information, although data payload may also be added if needed by the protocol. For example, time synchronization may be provided by transmitting a signal or a tone in which the transmitted signal or tone ends at a predefined time known to the sender and receiver(s). In this regard, some part of the transmission (e.g., beginning, end, or in between) may be used to pinpoint an instant, which corresponds to the predefined time. Accordingly, the receiver(s) may set their clocks to the predefined time, for example, when the signal ends or when a predefined byte in the packet is encountered. Hence, instead of using bytes of information (e.g., data packets) to convey time, a short tone or a predefined event is used, which may reduce the need for long messages.

An exemplary embodiment and/or exemplary method according to the present invention may synchronize the clocks of one or more receivers to a single transmitter, which may be particularly desirable in power constrained wireless networks where the duty cycle is limited. For example, according to an exemplary embodiment and/or exemplary method of the present invention, the transmitted signal may end at a predefined time known to the sender and multiple receivers, in which the receivers set their clocks to the predefined time, for example, when the signal ends or when a predefined byte in the packet is encountered. The exemplary method may be repeated to synchronize the nodes in the entire network by forming a chain or tree topology for instance.

An exemplary embodiment and/or exemplary method according to the present invention may be applied, for example, in wireless sensor networks, and to any other type of network, for power savings and/or limiting the transmission time.

An exemplary method according to the present invention may also remove any uncertainties that may arise due to medium access schemes such as CSMA (Carrier Sense Multiple Access), time needed to switch on the transmitter (variable time usually), etc.

According to an exemplary embodiment and/or exemplary method of the present invention, encoding may be used for error correction, as the transmission link may be error prone in wireless networks. However, encoding for error correction may increase the size of the packet and thereby the transmission time and power consumption may increase.

DETAILED DESCRIPTION

Figure 1:
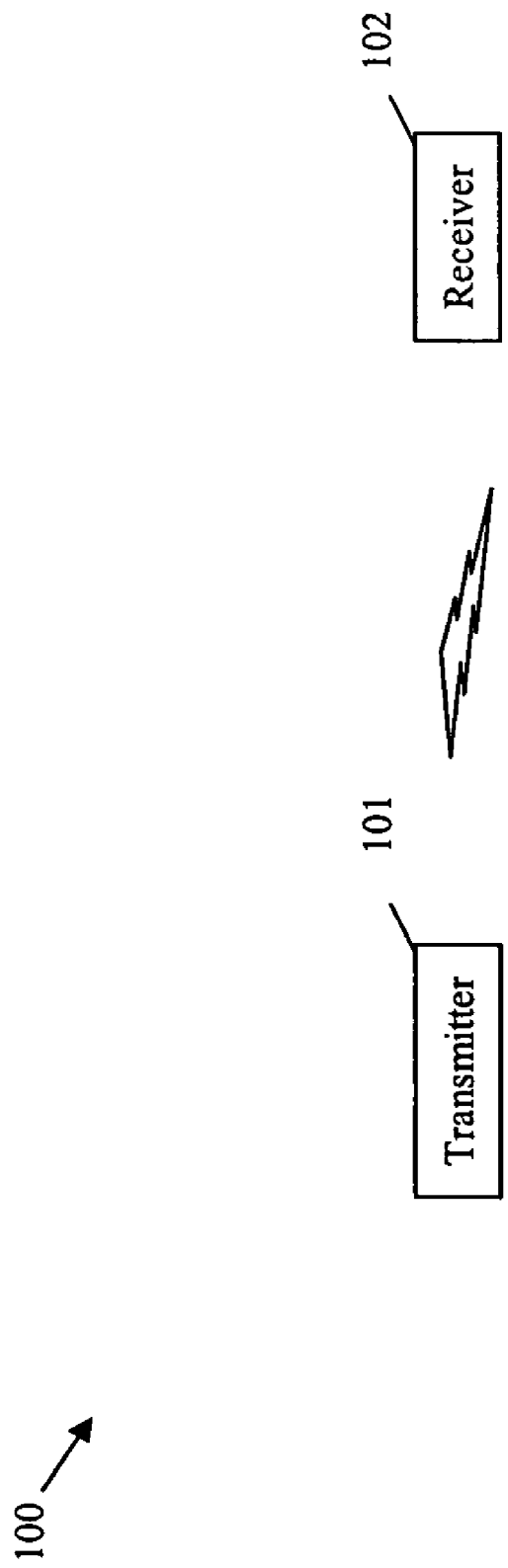
FIG. 1 shows an exemplary communication network.

FIG. 1 shows an exemplary communication network 100, which includes a transmitter node 101 and a receiver node 102. The exemplary communication network 100 may be, for example, a wireless communication network, and the transmitter node 101 and the receiver node 102 may be, for example, wireless communication devices.

According to an exemplary embodiment and/or exemplary method of the present invention, the transmitter node 101 sends a short pulse (also referred to as a tone) that ends at a predetermined time known to the transmitter node 101 and the receiver node 102. The tone may include, for example, preamble bytes (e.g., alternate zeros and ones) followed by a start symbol. The receiver node 102 sets its local time to the predetermined time when the tone ends, i.e., when the start symbol is received. The transmitted tone may be brief since additional overhead of bytes for time information and error correction are not required. This may result in a desired savings in transmission time and energy consumption. By contrast, time synchronization packets in other communication networks may require a preamble and start symbol, followed by a header and payload data. However, according to an exemplary embodiment and/or exemplary method of the present invention, the tone may be sufficient to convey the time information, and therefore the exemplary embodiment and/or exemplary method may be more efficient.

Using tones instead of packets may be also desired because in certain instances the tones may be heard from a much further distance as compared to data packets. For example, at greater distances from the transmitter, a data packet may not be discernable to a receiver as to the information contained therein, whereas a tone, which may barely audible at these greater distances, is still detectable by the receiver. Hence, at these greater distances where the transmission of the data packet or tone is detectable but the content of the data packet is not discernable, the tone may provide an advantage since the tone need only be detected and examined for its content like a data packet.

An exemplary method according to the present invention may be most energy-efficient when the transmitter is not energy constrained. In such systems the transmitter may transmit a tone long enough to cover the maximum clock skew and the required bytes before ending the tone. The receivers are required to receive only from their predefined time until the end of the tone.

Figure 2:
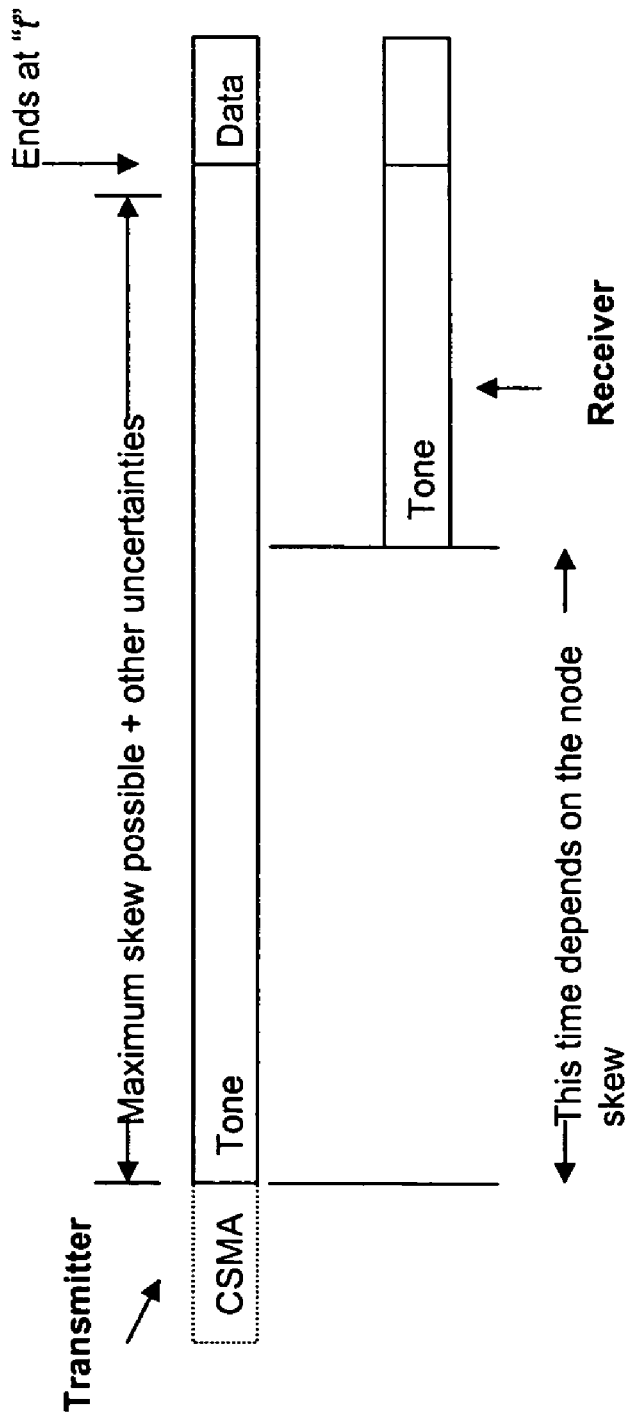
FIG. 2 shows an exemplary time line during an attempt to synchronize the network elements of the exemplary communication network of FIG. 1.

FIG. 2 shows an exemplary time line during an attempt to synchronize the network elements of the exemplary communication network 100 of FIG. 1. More specifically, FIG. 2 shows an exemplary time line for transmission of a tone by the transmitter node 101 and reception of the tone by the receiver node 102, during an attempt to synchronize the local time (e.g., clock) of the receiver node 102 with the local time (e.g., clock) of the transmitter node 101.

The predefined time for clock synchronization is t, and $\delta_{max}$ is the maximum clock skew between the transmitter node 101 and the receiver node 102. The transmitter node 101 transmits the tone for a period of at least $\delta_{max}$ to account for the maximum clock skew. The receiver node 102 wakes up at t-$\delta_{max}$ and listens for the tone. When the tone ends, the receiving node 102 knows that the transmitter node 101 time was t and sets its clock to t. The clock skew $\delta_{max}$ may assumed to be very small if the nodes synchronize often.

Figure 3:
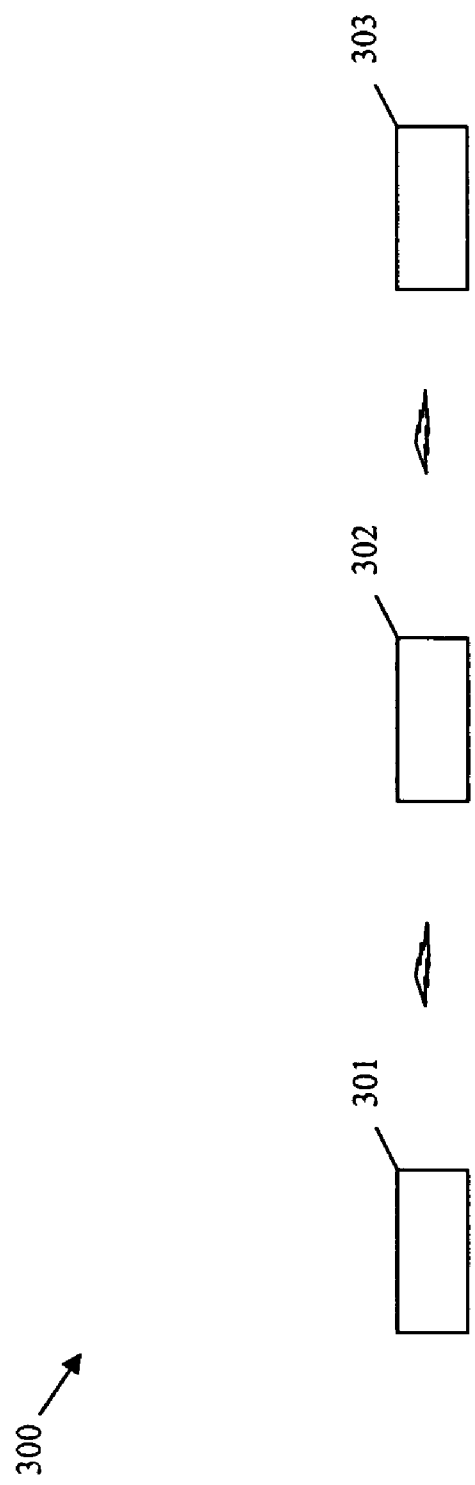
FIG. 3 shows an exemplary communication network, which includes three nodes arranged in a chain configuration.

FIG. 3 shows an exemplary communication network 300, which includes three nodes 301 to 303 arranged in a chain configuration. In particular, a first node 301 is arranged to communicate to a second node 302, which is arranged to communicate to a third node 303. The exemplary communication network 300 may be, for example, a wireless communication network, and the three nodes 301 to 303 may be, for example, wireless communication devices.

According to an exemplary embodiment and/or exemplary method of the present invention, the first node 301 sends a short tone that ends a predefined time known to the first node 301 and the second node 302. The second node 302 set its local time to the defined time when the tone ends. Thereafter, the second node 302 sends a short tone that ends at a subsequent predetermined time known to the second node 302 and the third node 303. The third node 303 sets its local time to the subsequent predetermined time when the tone ends.

Figure 4:
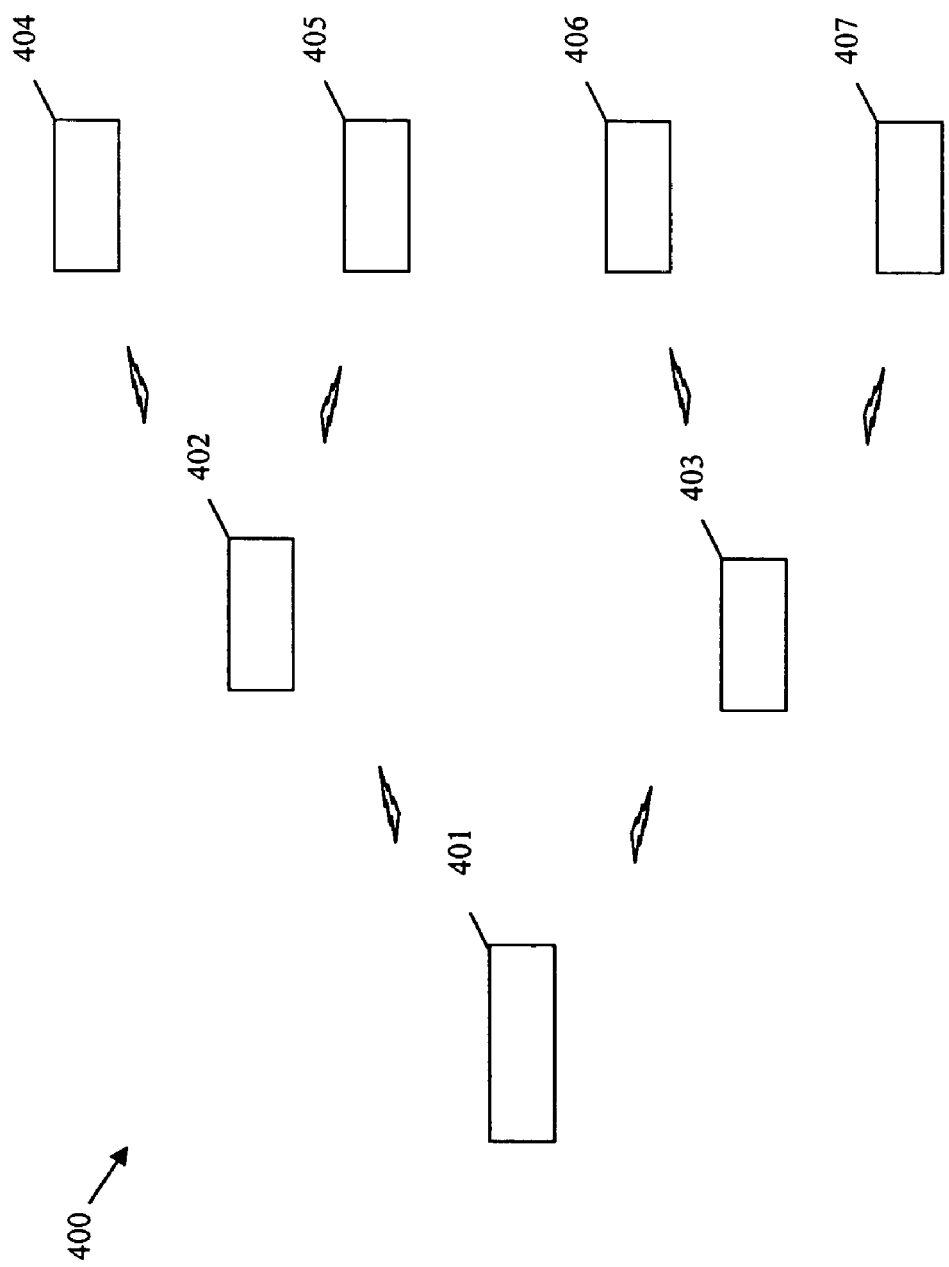
FIG. 4 shows an exemplary communication network, which includes seven nodes arranged in a hierarchical manner.

FIG. 4 shows an exemplary communication network 400, which includes seven nodes 401 to 407 arranged in a hierarchical manner. In particular, a first node 401 is arranged to communicate to a second node 402 and a third node 403, the second node 402 is arranged to communicate with a fourth node 404 and a fifth node 405, and a third node 403 is arranged to communicate with a sixth node 406 and a seventh node 407. The exemplary communication network 400 may be, for example, a wireless communication network, and the seventh nodes 401 to 407 may be, for example, wireless communication devices.

According to an exemplary embodiment and/or exemplary method of the present invention, the first node 401 sends a short tone that ends at a predetermined time known to the second node 402 and the third node 403. The second node 402 and the third node 403 set their local time to the predefined time when the tone ends. Thereafter, the second node 402 sends a short tone that ends a subsequent predetermined time known to the fourth node 404 and the fifth node 405, which set their local time to the subsequent predetermined time known to the fourth node 404 and the fifth node 405, which set their local time to the subsequent predetermined time when the tone ends. Likewise, the third node 403 sends a short tone that ends at a subsequent predetermined time known to the sixth node 406 and the seventh node 407, which set their local time to the subsequent predetermined time when the tone ends. In this regard, the tones sent by the second node 402 and the third node 403 may occur at the same subsequent predetermined time or at different subsequent predetermined times.

Wireless sensor networks for intrusion detection and fire alarm systems may have stringent requirements. For using the security frequency band at 868 MHz, the European Telecommunication Standards Institute (ETSI) limits the transmission duty cycle to 0.1% and channel bandwidth to 25 KHz. The low bandwidth increases the time needed to transmit a packet, but the low duty cycle (0.1%) limits the transmission time in a given interval. For time synchronization, an exemplary method according to the present invention may better enable systems to meet these conflicting requirements by reducing the transmission time for sending the time information.

Figure 5:
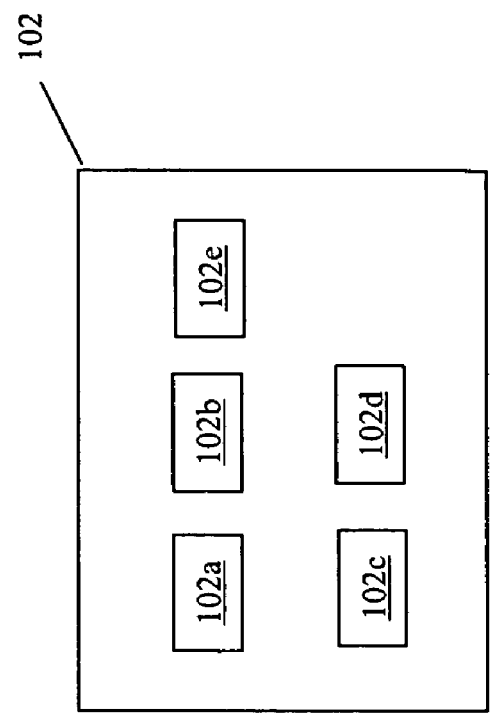
FIG. 5 shows exemplary embodiments of the transmitter node 101 and receiver node 102 of the exemplary communication network 100 of FIG. 1.
Figure 5:
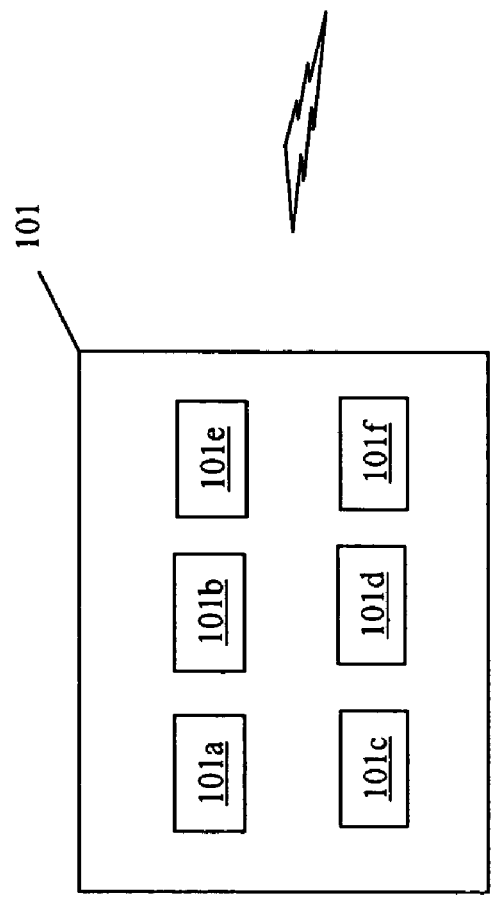

FIG. 5 shows exemplary embodiments of the transmitter node 101 and receiver node 102 of the exemplary communication network 100 of FIG. 1. The transmitter node 101 includes a transceiver device 101a, a control unit 101b, a clock 101c, a processing arrangement 101d (e.g., CPU), memory 101e, and a tone generator 101f. The receiver node 102 includes a transceiver device 102a, a control unit 102b, a clock 102c, a processing arrangement 102d (e.g., CPU), and memory 102e

What is claimed is:

1. A method of synchronizing a receiver clock of a receiver to a transmitter clock of a transmitter within a network, comprising:
    waking up the receiver at a wake-up time;
    receiving by the receiver a tone signal transmitted by the transmitter, the tone signal beginning at a start time and ending at an end time that is different from the start time; and
    at the end time, setting the receiver clock to a predefined time to synchronize the receiver clock to the transmitter clock;
    wherein:
        the wake-up time is a receiver clock time that is set such that a period extending from the wake-up time to the predefined time is at least as long as a maximum time skew of the receiver clock relative to the transmitter clock that occurs between two consecutive synchronizations; and
        the predefined time is set at the receiver prior to the transmission of the tone signal.

2. The method of claim 1, wherein the signal includes a preamble followed by a start symbol.

3. The method of claim 1, wherein the tone signal does not include any data packets.

4. The method of claim 1, wherein the network includes wireless sensor nodes.

5. A method for synchronizing a receiver clock of a receiver to a transmitter clock of a transmitter in a communication network, comprising:
    scheduling the receiver to periodically wake up at wake-up times;
    waking up the receiver at the wake-up times;
    for each wake-up:
        receiving by the receiver a tone signal from the transmitter, the tone signal beginning at a start time, and ending at an end time that is different from the start time;
        detecting by the receiver an occurrence of a predefined aspect of the tone signal; and
        setting the receiver clock to a predefined time at an instant when the receiver detects the occurrence of the predefined aspect of the signal to synchronize the receiver clock to the transmitter clock;
    wherein:
        the predefined aspect is the ending of the tone signal;
        the wake-up time is a receiver clock time that is set such that a period extending from the wake-up time to the predefined time is at least as long as a maximum time skew between the receiver clock relative to the transmitter clock that occurs between two consecutive synchronizations.

6. The method of claim 5, wherein the tone signal is transmitted for at least a period selected based on a calculation whose output period length value is inversely proportionate to a frequency at which synchronizing is performed.

7. The method of claim 5, wherein the elements of the communication network form a chain topology and the method is repeated through the chain.

8. The method of claim 5, wherein elements of the communication network form a tree topology and the method is repeated through each branch of the tree.

9. A communication system, comprising:
a transmitter operating under a transmitter clock to transmit a signal having a start time and an end time that is different than the start time; and
a receiver operating under a receiver clock to:
wake up at a wake-up time;
receive the signal; and
at the end time of the signal, set the receiver clock to a predefined time to synchronize the receiver clock to the transmitter clock;
wherein:
the wake-up time is a receiver clock time that is set such that a period extending from the wake-up time to the predefined time is at least as long as a maximum time skew of the receiver clock relative to the transmitter clock that occurs between two consecutive synchronizations; and
the predefined time for synchronization is set at the receiver prior to the transmission of the signal.

10. The communication system of claim 9, wherein the signal is a tone.

11. The communication system of claim 10, wherein the tone includes a preamble followed by a start symbol.

12. The communication system of claim 9, wherein the receiver periodically wakes up from a sleep cycle to receive the signal, and the signal is transmitted for at least a period selected based on a calculation whose output period length value is inversely proportionate to a frequency at which the setting of the receiver clock to the predefined time is performed.

13. An apparatus operating under a local clock for synchronizing a communication network comprising:
a first arrangement to wake up at a wake-up time to receive a tone signal, the tone signal beginning at a start time, and ending at an end time that is different than the start time;
a second arrangement to detect an occurrence of a predefined aspect of the tone signal; and
a third arrangement to set the local clock to a predefined time at the occurrence of the predefined aspect of the tone signal;
wherein:
the wake-up time is a local clock time that is set such that a period extending from the wake-up time to the predefined time is at least as long as a maximum time skew of the local clock relative to a transmitter clock that occurs between two consecutive synchronizations;
the predefined aspect is an ending of the tone signal; and
the predefined time is set at the apparatus prior to the receipt of the tone signal.

14. A method of synchronizing a network, comprising:
predefining a first predefined time in a memory of a first receiver node;
waking up the first receiver node at a wake-up time;
receiving by the first receiver node a tone signal transmitted, subsequent to the predefining, by a transmitter node, the tone signal beginning at a start time, and ending at an end time that is different from the start time;
responsive to the received tone signal, setting a time of a local clock of the first receiver node to the stored first predefined time,
wherein the wake-up time is a local clock time that is set such that a period extending from the wake-up time to the predefined time is at least as long as a maximum time skew of the local clock relative to a transmitter clock that occurs between two consecutive synchronizations.

15. The method of claim 14, wherein the tone signal does not include data stating a time.

16. The method of claim 14, wherein:
the network includes a plurality of hierarchically arranged nodes so that the nodes communicate sequentially from a higher level to a lower level, the nodes including the transmitter and first receiver nodes; and
the method further comprises:
subsequent to the setting the time of the local clock, the first receiver node transmitting a tone signal to at least one second receiver node, the at least one second receiver node being of a hierarchically lower level than the first receiver node;
responsive to receipt of the tone signal transmitted by the first receiver node, setting, at each of the at least one second receiver node, a time of a respective clock of the respective second receiver node to a second predefined time later than the first predefined time.

17. The method of claim 1, wherein the maximum time skew is due to clock crystal inaccuracies.

18. The system of claim 1, wherein the more often the receiver and transmitter clocks are synchronized, the shorter the period extending from the wake-up time to the predefined time.

19. The method of claim 5, wherein the maximum skew is due to clock crystal inaccuracies.

20. The method of claim 5, wherein the tone signal is transmitted for at least a period selected based on a calculation whose output period length value is dependent upon how often the receiver and transmitter clocks are synchronized.

21. The method of claim 20, wherein the more often the receiver and transmitter clocks are synchronized, the shorter the output period length.

22. The system of claim 9, wherein the maximum time skew is due to clock crystal inaccuracies.

* * * * *